Jan. 20, 1953 — E. H. NAGEL — 2,625,891
DOUGHNUT CUTTER AND FORMER
Filed April 2, 1949
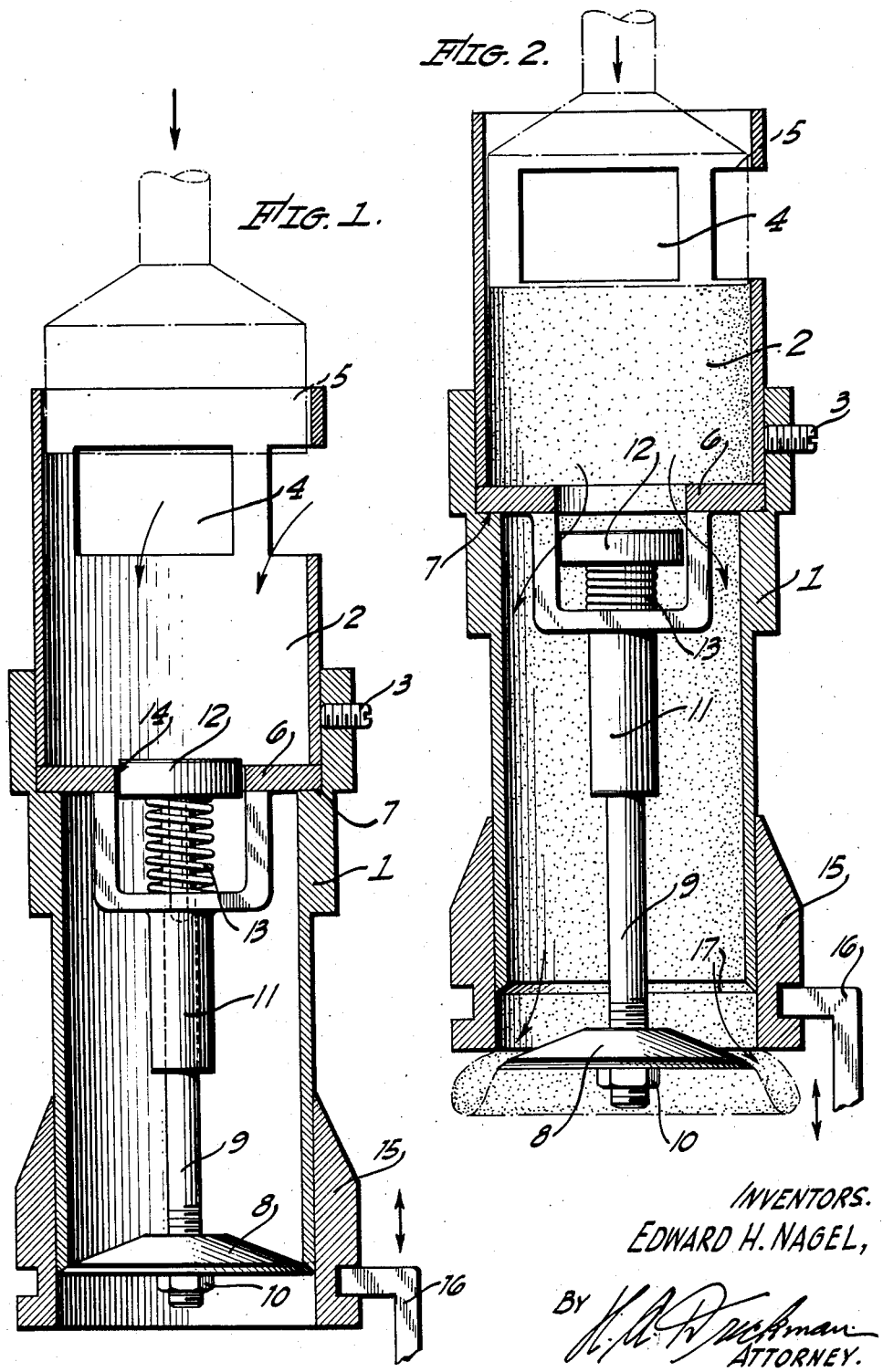
INVENTORS.
EDWARD H. NAGEL,
BY
ATTORNEY.

Patented Jan. 20, 1953

2,625,891

UNITED STATES PATENT OFFICE 2,625,891

DOUGHNUT CUTTER AND FORMER

Edward H. Nagel, Long Beach, Calif., assignor to Coma F. Norris, Long Beach, Calif.

Application April 2, 1949, Serial No. 85,128

9 Claims. (Cl. 107—14)

This invention is an improvement on a co-pending application, Serial Number 740,224, filed April 8, 1947, in which I am a co-inventor.

This invention relates to an improved doughnut dough dispenser wherein the dough is automatically extruded, formed and cut to produce a complete doughnut ready for frying.

An object of my invention is to provide a doughnut dough dispenser of the character stated, in which the parts can be readily disassembled for the purpose of cleaning the various internal parts.

Another object of my invention is to provide a novel doughnut dough dispenser of the character stated, in which an automatic valve is provided to retain a constant quantity of dough adjacent the outlet of the dispenser so that a quantity of dough is always ready to be extruded and formed.

A feature of my invention is to provide a novel doughnut dough dispenser of the character stated, in which the automatic valve which retains the dough adjacent the outlet is so constructed that expansion of the dough due to heat will be permitted to pass this valve.

Other objects, advantages and features of invention may appear from the accompanying drawing, the subjoined detailed description and the appended claims.

In the drawing:

Figure 1 is a longitudinal sectional view of my doughnut dough dispenser, showing the valves in closed position.

Figure 2 is a view similar to Figure 1, but with the valves in open position.

Referring more particularly to the drawing, my improved dough dispenser consists of a cylinder 1, which is mounted in a tank containing the dough, as disclosed in the co-pending application set forth above. The cylinder 1 is fixedly mounted in the tank and protrudes from the bottom of the tank. A sleeve 2 is removably mounted in the top of the cylinder 1 and is held fixedly in position by the set screw 3.

A plurality of ports 4 are formed adjacent the upper end of the sleeve 2 and these ports are open to the dough in the tank, that is, dough can freely flow through these ports at all times. The dough flows into the ports 4 by gravity. A piston 5 is reciprocally mounted within the sleeve 2 and this piston is reciprocated within the sleeve by suitable means whereby its bottom end may be moved from a point above the ports 4 to a point below these ports. Accordingly, vertical movement of the piston 5 will open and close the ports 4, as shown by the two positions of the piston in Figures 1 and 2.

A spider 6 is mounted within the cylinder 1 and rests on a shoulder 7 provided on the upper end of the cylinder. The sleeve 2 bears against the top of the spider, thus holding this spider removably positioned within the cylinder whereby removal of the sleeve 2 by releasing the set screw 3 will also enable the spider 6 to be removed for cleaning purposes. A valve 8 is positioned in the bottom of the cylinder 1 and seats against the bottom of this cylinder. The valve 8 is held on a stem 9 by the nut 10 and removal of this nut permits the valve 8 to be removed from the stem 9. The stem fits within a guide 11 on the spider 6, thus guiding the valve 8 in its reciprocal movement.

A valve block 12 is attached to the upper end of the stem 9, preferably by threading this block into the stem. A spring 13 bears against the valve block 12 and against the spider 6, thus urging the valve 8 to a closed position, as shown in Figure 1. The valve block fits loosely within the spider 6, that is, a space 14 is provided around the valve when in closed position to permit the dough to force itself upwardly due to expansion of the dough when its temperature is raised. This temperature rise will occur whenever the dispenser does not undergo use for some time whereby the heat contained in the frying grease over which it is positioned is transferred to the dough.

A cutter ring 15 is slidably mounted on the outside of the cylinder 1 and this cutter ring is reciprocated by the finger 16, as described in the co-pending application above described.

Operation

In operation, as soon as the piston 5 starts moving downwardly, pressure will be exerted on the dough within the sleeve 2 and the valve block 12 will be pressed downwardly to the position shown in Figure 2. This downward movement of the valve block 12 will also move the valve 8 downward providing the annular space 17, through which the dough passes to form the doughnut. When the piston 5 completely closes the ports 4, the cutter ring 15 will be moved downwardly by the fingers 16 and will cut off the ring of dough, dropping it downwardly into the frying grease. Upward movement of the piston 5 will cause a partial vacuum within the sleeve 2, thus drawing the valve 8 to its closed position, shown in Figure 1. In the closed position of the valve 8, the valve block 12 will partially close the spider 6, however, expansion of the dough above the valve 8 is still permitted due to the space 14.

Having described my invention, I claim:

1. A doughnut dough dispenser comprising a cylinder, said cylinder including a coaxial sleeve portion at its upper end, said sleeve portion having intake ports formed adjacent its upper end through which dough is adapted to move, a piston reciprocally mounted in the cylinder, said piston being movable over said ports, cutter means on the lower end of said cylinder, a transverse wall in said cylinder below the piston, said wall having a hole extending therethrough, a valve block mounted for vertical movement relative to said hole, said valve block being adapted to incompletely close the hole in one position of the valve block.

2. A doughnut dough dispenser comprising a cylinder, said cylinder including a coaxial sleeve portion at its upper end, said sleeve portion having intake ports formed adjacent its upper end through which dough is adapted to move, a piston reciprocally mounted in the cylinder, said piston being movable over said ports, cutter means on the lower end of said cylinder, including a ring reciprocally mounted on the lower end of said cylinder, a transverse wall in said cylinder below the piston, said wall having a hole extending therethrough, a valve block mounted for vertical movement relative to said hole, said valve block being adapted to incompletely close the hole in one position of the valve block.

3. A doughnut dough dispenser comprising a cylinder, said cylinder including a coaxial sleeve portion at its upper end, said sleeve portion having intake ports formed adjacent its upper end thereof and through which dough is adapted to move, a piston reciprocally mounted in the cylinder, said piston being movable over said ports, a valve seated in the lower end of said cylinder, a stem rising from said valve, a transverse wall in said cylinder below the piston, a spider on said wall, said stem extending through and guided by the spider, said transverse wall having a hole therein, and a valve block mounted on said stem and movable vertically relative to said hole in the spider to incompletely close the hole in one position of the valve block.

4. A doughnut dough dispenser comprising a cylinder, said cylinder including a coaxial sleeve portion at its upper end, said sleeve portion having intake ports formed adjacent its upper end thereof and through which dough is adapted to move, a piston reciprocally mounted in the cylinder, said piston being movable over said ports, a valve seated in the lower end of said cylinder, a stem rising from said valve, a transverse wall in said cylinder below the piston, a spider on said wall, said stem extending through and guided by the spider, said transverse wall having a hole therein, and a valve block mounted on said stem and movable vertically relative to said hole in the spider to incompletely close the hole in one position of the valve block, cutter means on the lower end of said cylinder, said cutter means comprising a ring reciprocally mounted on the cylinder.

5. A doughnut dough dispenser comprising a cylinder, said cylinder including a coaxial sleeve portion at its upper end, said sleeve portion having intake ports formed adjacent its upper end thereof and through which dough is adapted to move, a piston reciprocally mounted in the cylinder, said piston being movable over said ports, a valve seated in the lower end of said cylinder, a stem rising from said valve, a transverse wall in said cylinder below the piston, a spider on said wall, said stem extending through and guided by the spider, said transverse wall having a hole therein, and a valve block mounted on said stem and movable vertically relative to said hole in the spider to incompletely close the hole in one position of the valve block, and spring means engaging the valve block to urge said valve and valve block into closed position.

6. A doughnut dough dispenser comprising a cylinder, said cylinder including a coaxial sleeve portion at its upper end, said sleeve portion having intake ports formed adjacent its upper end thereof and through which dough is adapted to move, a piston reciprocally mounted in the cylinder, said piston being movable over said ports, a valve seated in the lower end of said cylinder, a stem rising from said valve, a transverse wall in said cylinder below the piston, a spider on said wall, said stem extending through and guided by the spider, said transverse wall having a hole therein, and a valve block mounted on said stem and movable vertically relative to said hole in the spider to incompletely close the hole in one position of the valve block, cutter means on the lower end of said cylinder, said cutter means comprising a ring reciprocally mounted on the cylinder, and a spring means engaging the valve block to urge said valve and valve block into closed position.

7. A doughnut dough dispenser comprising a cylinder, a sleeve rising from the cylinder, means detachably securing the sleeve to the cylinder, said sleeve having intake ports therein, through which dough is adapted to pass, a piston reciprocally mounted in the sleeve, a transverse wall in the cylinder, said transverse wall having a hole extending therethrough, a valve seated in the lower end of the cylinder, a stem rising from the valve, a valve block on the upper end of said stem, said valve block being movable relative to said hole as the valve moves to open and close said hole, and spring means engaging the valve block to urge said valve and valve block into closed position.

8. A doughnut dough dispenser comprising a cylinder, a sleeve rising from the cylinder, means detachably securing the sleeve to the cylinder, said sleeve having intake ports therein, through which dough is adapted to pass, a piston reciprocally mounted in the sleeve, a transverse wall in the cylinder, said transverse wall having a hole extending therethrough, a valve seated in the lower end of the cylinder, a stem rising from the valve, a valve block on the upper end of said stem, said valve block being movable relative to said hole as the valve moves to open and close said hole, and spring means engaging the valve block to urge said valve and valve block into closed position, a spider depending from said wall, said valve stem being journalled in the spider, and a cutter ring reciprocally mounted on the lower end of the cylinder.

9. A doughnut dough dispenser comprising, a vertically extending cylindrical member formed with ports in its upper walls through which dough is adapted to move, a piston mounted for vertical reciprocal movement in said piston over said ports, a transverse wall in said cylindrical member positioned below the lowest point reached by said piston as it is reciprocated, said wall being formed with a hole, a valve block mounted for vertical movement relative to said hole, said valve block being adapted to incompletely close the hole in one position of said valve block.

EDWARD H. NAGEL.

REFERENCES CITED

The following references are of record in the file of this patent:

UNITED STATES PATENTS

| Number | Name | Date |
| --- | --- | --- |
| 2,024,428 | Carpenter | Dec. 17, 1935 |
| 2,256,617 | Kipnis | Sept. 23, 1941 |